United States Patent [19]

Juziuk et al.

[11] Patent Number: 4,627,826
[45] Date of Patent: Dec. 9, 1986

[54] MULTI-SEGMENT, NON-FLEXIBLE BOOT FOR MECHANICAL JOINT

[75] Inventors: Peter M. Juziuk, Huntington Woods; Daniel W. Hazebrook, Detroit, both of Mich.

[73] Assignee: GKN Automotive Components Inc., Southfield, Mich.

[21] Appl. No.: 702,051

[22] Filed: Feb. 15, 1985

[51] Int. Cl.⁴ ............................................. F16D 3/84
[52] U.S. Cl. ........................... 464/171; 277/212 FB; 464/175
[58] Field of Search ................. 277/212 FB, 30, 212; 464/145, 172, 173, 175, 905, 906, 171

[56] References Cited

U.S. PATENT DOCUMENTS

| | | | |
|---|---|---|---|
| 2,211,388 | 8/1940 | Salvetti | 464/905 X |
| 3,075,370 | 1/1963 | Kings | 464/173 X |
| 3,260,071 | 7/1966 | Westercamp | 464/173 X |
| 3,362,192 | 1/1968 | Orain | 464/906 X |

Primary Examiner—Stuart S. Levy
Assistant Examiner—Daniel P. Stodola
Attorney, Agent, or Firm—Remy J. VanOphem

[57] ABSTRACT

A sealing boot for sealing a power transmitting mechanical joint, especially a mechanical joint which is subject to angular articulation between its input shaft and output shaft. The mechanical joint has an outer race which is a part of its output shaft, and the outer race has an external spherical surface. The sealing boot has a non-flexible portion which surrounds a portion of the outer race, and this non-flexible portion has a spherical inner surface which sealingly engages the external spherical sealing surface of the outer race in surface-to-surface contact. The non-flexible portion of the boot and the outer race of the joint can be articulated relative to one another without breaking the seal therebetween. In the preferred embodiment the remainder of the boot constitutes a non-pleated non-flexible second boot segment, one end of which is received in a spherical slot of the first non-flexible portion and the other end of which sealingly engages the input shaft of the mechanical joint. A portion of the articulation required of the power transmitting mechanical joint is obtained by the movement of the second boot segment in the spherical slot of the spherical boot segment. Additional articulation is provided by the spherical sliding of the spherical boot segment on the spherical surface of the outer race after the second boot segment bottoms in the spherical slot of the spherical boot segment.

12 Claims, 3 Drawing Figures

MULTI-SEGMENT, NON-FLEXIBLE BOOT FOR MECHANICAL JOINT

BACKGROUND OF THE INVENTION

1. Field of the Invention

This invention relates to a boot or seal for a power transmitting mechanical joint, especially for a joint which is subject to articulation during operation. More particularly, this invention relates to a boot or seal of the aforesaid type in which at least a portion of such boot is of a non-flexible character. Specifically, this invention relates to a boot or seal for a constant velocity joint of the type used in driving a front wheel of a front wheel drive automotive vehicle, in which the portion of the seal or boot which engages the outer race of the joint is of a semi-rigid character.

2. Description of the Prior Art

Constant velocity drive joints are widely used in the automotive industry as means to transmit power from the transmission of a front wheel drive vehicle to the driven front wheels of the vehicle, with one or more of such joints being provided for each of the driven wheels. Each such drive joint must be sealed, of course, to maintain the necessary lubrication in place within the joint and to keep the joint free from contamination by dirt and other external contaminants.

The devices heretofore used to accomplish this sealing function, which are usually referred to as seals or boots, have been of a flexible construction, usually constructed of an elastomeric material and usually in a pleated configuration. Such flexible construction, however derived, gives the boot the ability to distort to accommodate articulation or angular movement of the normally axially aligned input and output shafts of the joint, an operating condition which can develop due to road vibration or cornering, for example, without breaking the seal of the joint during such articulation.

Flexible boots or seals for automotive constant velocity drive joints, as heretofore described, have been utilized quite extensively. However, these seals are quite expensive, and due to the fact that their dimensions readily change by virtue of their flexible nature, they must be installed using manual operations, which precludes the use of some cost-saving mechanical assembly techniques that rely on precise dimensions of the part being installed. Additionally, these flexible boots or seals, which are made from elastomeric materials, are subject to puncture in use due to road hazards and other forms of concentrated impacts, and these materials are known to be subject to degradation of properties when exposed to low temperatures or high temperatures of the type that can be encountered during the normal life of an automobile. Additionally, due to the pleated configuration of these flexible boots or seals, the interior volume, which must be filled with grease to properly lubricate the associated joint, requires a rather large volume of grease for that purpose. Furthermore, many elastomeric materials are subject to degradation when exposed to grease, and the grease sensitivity further limits the useful life of such flexible seals.

SUMMARY OF THE INVENTION

In accordance with the present invention there is provided a seal or boot for a mechanical joint, such as a constant velocity front wheel drive joint for an automotive vehicle. This boot is manufactured, at least in part, from a non-flexible material, preferably a semi-rigid polymeric material, such as a thermosetting material, and the assembled expense of a joint having such a boot can be substantially reduced relative to the assembled expense of a prior art joint having a flexible boot without detracting from the performance features of the joint or its boot. Additionally, such a boot has improved properties relative to its prior art flexible counterpart in that the semi-rigid portion of the present invention is more puncture resistant than an elastomeric boot, it is more tolerant of high and low temperatures, and it is less subject to degradation in contact with grease.

The non-flexible portion of the boot of the present invention has an open end portion which faces the output end of the joint, and this open end portion surrounds the joint end portion of the outer race of the joint, the joint end portion of the outer race being at the joint end of the output shaft which delivers power from the joint to the driven member. The open end portion of the boot has a spherical inner surface which lies in face-to-face sealing contact with a spherical outer surface on the outer race of the joint, and this surface-to-surface sealing relationship between the semi-rigid end portion of the boot and the outer race of the joint permits a predetermined and acceptable degree of articulation between the boot and the outer race without breaking the seal therebetween. To maintain the desired assembled relationship between the semi-rigid portion of the boot and the outer race of the joint, a slight interference or snap fit is provided therebetween by making the diameter of the open end of this portion of the boot slightly less than the diameter of its spherical sealing surface. This assembled relationship can be augmented by the use of annular constricting means, such as a lip-type seal or an O-ring seal, surrounding the open end of the semi-rigid portion of the boot to press it firmly against the outer race of the joint.

In the preferred embodiment of the present invention the boot is constructed of a pair of semi-rigid, axially aligned, open-ended boot segments including a segment which seals in surface-to-surface relationship against the spherical outer surface of the outer race of the joint. Such a boot also includes, as the second semi-rigid segment, a non-pleated boot segment. Articulation between these boot segments is obtained by providing the first boot segment with a spherical annular groove at its input end and by providing the second boot segment with a spherical output free end which is received in the spherical annular groove of the semi-rigid boot segment in surface-to-surface sealing relationship therewith.

In an alternative embodiment of the present invention the boot is constructed from a pair of axially aligned open-ended boot segments, including a non-flexible or semi-rigid segment which seals against the outer surface of the outer race of the joint and which is formed from a semi-rigid material, such as a thermosetting polymeric material. This non-flexible segment is connected at its other or input shaft end in an articulating interlocking circumferential seam to the output shaft end of an elastomeric boot segment. This elastomeric boot segment, which preferably is of a pleated construction for maximum flexibility, in turn, has its input shaft end sealingly connected to the input shaft of the joint, and an annular restraining clamp is provided to keep the free end of the elastomeric boot segment in tight engagement with the input shaft. The annular clamp is positioned in a radially outwardly facing annular groove in the elastomeric boot segment adjacent the free end of this boot segment.

In yet another embodiment of the present invention, the boot is constructed of a single boot segment formed from a variable hardness polymeric material. The input shaft end of this boot is somewhat softer than the output end and it is pleated in configuration to be able to distort to absorb some articulation of the joint members in spite of the hardness of the boot material at the output shaft end of the boot, and because of the hardness of the boot material at its output shaft end, it can be provided with a spherical sealing surface at that location to seal against the spherical sealing surface of the outer race of the joint to permit articulation therebetween.

Accordingly, it is an object of the present invention to provide an improved boot for sealing a mechanical power transmitting joint.

More particularly, it is an object of the present invention to provide an improved boot for sealing a power transmitting mechanical joint whose input and output members are subject to articulation relative to one another.

More particularly, it is an object of the present invention to provide an improved boot for sealing a constant velocity drive joint.

More particularly, it is an object of the present invention to provide an improved boot for sealing a constant velocity drive joint used to drive a front wheel of a front wheel drive automotive vehicle.

It is a further object of the present invention to provide a boot for sealing a constant velocity drive joint of a front wheel drive automotive vehicle in which the boot has a portion that is formed from a nonflexible material with an inner spherical sealing surface that seals against the outer spherical sealing surface of a member of the joint in a way which permits articulation between such portion of the boot and such member of the joint.

Other objects and advantages of this invention will become apparent from the following detailed description taken in conjunction with the accompanying drawings.

DETAILED DESCRIPTION OF THE PREFERRED EMBODIMENT

Figure 1:
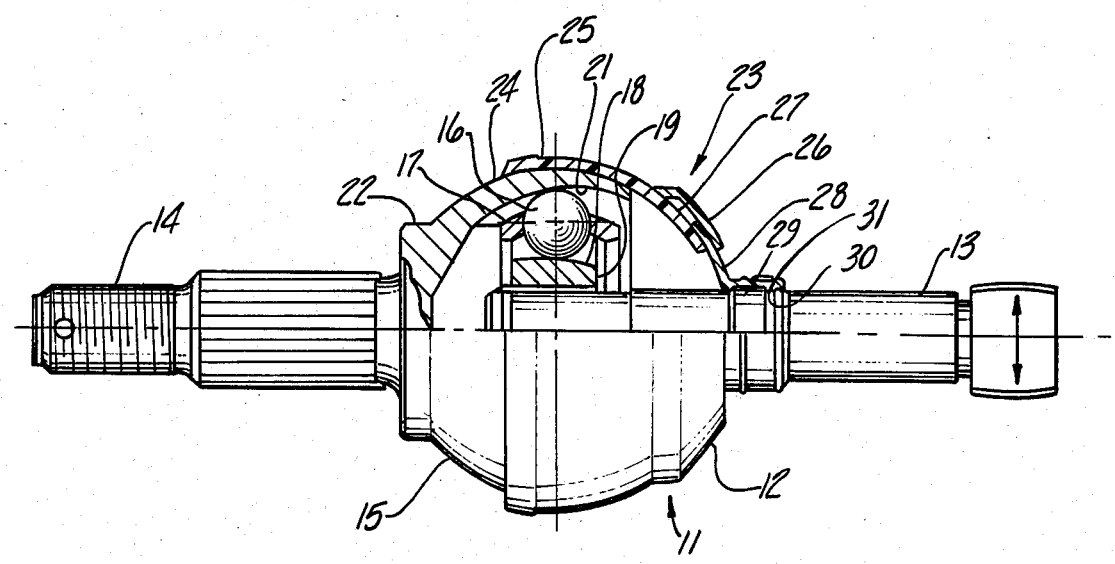
FIG. 1 is an elevational view, partially in section, of a constant velocity drive joint having a preferred embodiment of a sealing boot according to the present invention.

FIG. 1 illustrates a constant velocity drive joint of the fixed or non-plunging type, indicated generally by reference numeral 11. The c.v. drive joint 11 receives power at an input end 12 from an input shaft 13 and transmits power to a driven member, not shown, by an output shaft 14 which extends from an output end 15 of the c.v. drive joint 11. As is known in the prior art, power is transmitted from the input shaft 13 to the output shaft 14 by means of a circumferential series of balls 16, typically six in number, which are contained in a bearing cage 17. The balls 16 roll on a spherical surface 18 of an inner race 19, which is keyed or otherwise secured to the input shaft 13 and, simultaneously, the balls 16 roll on a spherical inner surface 21 of an outer race 22, which constitutes an integral part of the output shaft 14. The outer race may be formed by forging, for example.

In operation, the input shaft 13 and the output shaft 14 are subject to articulation or angular distortion from the normal axial orientation between these members, which is depicted in FIG. 1. In the case of a drive joint for driving a front wheel of a front wheel drive automobile, this articulation can be of the order of forty-five (45°) in each direction and can result, for example, from normal road vibrations and bumps encountered by such a vehicle and from the cornering of the vehicle. The c.v. drive joint 11 itself is quite capable of accommodating this degree of articulation due to the fact that the balls 16 are in rolling engagement with the spherical surfaces 18 and 21 of the inner and outer races 19 and 22, respectively.

The c.v. drive joint 11, as heretofore described, contains precision machined components which move relative to one another and, therefore, it must be kept lubricated and free from contamination by dirt and other contaminants that may be encountered in an automotive environment. To this end the c.v. drive joint 11 is provided with a boot, indicated generally at 23, to seal the interior of the c.v. drive joint 11. Of course, the boot 23 must be capable of accommodating the degree of articulation that the c.v. drive joint 11 itself is subject to without loss of the sealing characteristics of the boot 23 during or as a result of such articulation, and in an automotive application it should be capable of doing so for many years.

As previously noted, the c.v. drive joint 11 must be capable of accommodating a substantial degree of angular articulation between the input shaft 13 and the output shaft 14. For an automotive front wheel drive joint, this articulation may frequently reach approximately twenty degrees (20°) in each direction during normal driving and may occasionally reach approximately forty-five degrees (45°) in each direction during the severe conditions encountered in sharp turns. The necessary articulation of the boot 23 can be obtained by constructing the outer race 22 of the drive joint with a spherical outer surface 24 and by constructing the boot 23 from a pair of boot segments. In the case of a forged outer race, the spherical outer surface 24 is preferably unmachined to reduce the cost thereof. The first of these boot segments is a semi-rigid segment 25 which has a spherical inner surface engaging the spherical outer surface 24 of the outer race in surface-to-surface sealing engagement. It is also contemplated that the sealing boot of the present invention can be utilized with existing c.v. universal joints which utilize a cylindrical or other non-spherical outer race. In such a case, a plastic or other type of fitment should be attached to the outer race, and this fitment should have the spherical outer surface for effecting surface-to-surface sealing engagement with the sealing boot.

The input shaft end 12 of the semi-rigid segment 25 has an offset member 26 attached thereto, and the offset member 26 defines a generally spherical groove 27 with the outer surface of the first segment which it overlies. The second segment of the boot 23 is a non-pleated semi-rigid segment 28, an end of which is sealingly received in the spherical groove 27. The other end of the segment 28 sealingly surrounds and engages a portion 29 of the input shaft 13.

The articulation of the c.v. joint 11 is partially accommodated by the articulation of the free end of the non-pleated semi-rigid segment 28 within the spherical groove 27. This articulation preferably is sufficient to accommodate all bumps and turning vibrations which may be encountered during normal service of the drive joint, for example, up to approximately twenty degrees (20°) in each direction in an automotive front wheel drive joint. The dimensions of the free end of the non-pleated semi-rigid segment 28 and the spherical groove 27 are such that the non-pleated semi-rigid segment 28 will bottom in the spherical groove 27 when this degree of articulation has been reached. Further articulation is then obtained by the spherical sliding of the semi-rigid segment 25 around the spherical outer surface 24 of the outer race 22. This articulation can accommodate up to an additional approximately twenty-five degrees (25°) of articulation in each direction, after the non-pleated semi-rigid segment 28 has bottomed in the spherical groove 27 and, in an automotive front wheel drive joint, this additional or secondary articulation comes into play during the occasional instances of sharp turning and/or severe jounce or rebound.

The semi-rigid and non-pleated semi-rigid segments 25 and 28, respectively, of the boot 23 are manufactured from tough, puncture-resistant, non-elastomeric, or semi-rigid polymeric materials, and a glass impregnated nylon (polyamide) material has proven to be well suited for the manufacture of each of these segments. When so manufactured, the boot 23 will be considerably more resistant to puncturing or tearing than the flexible, elastomeric boots of prior art drive joints, and it will have dimensions which will fall within precise tolerances, thus, lending itself to mechanical handling techniques during assembly where assembly labor costs can be reduced in that manner. Additionally, the boot 23 will be more resistant to the extremes of high and low temperatures that can be encountered during the normal life of an automotive front wheel drive joint, and it will be more resistant to degradation from contact with the grease contained in the c.v. drive joint 11. As another feature of the boot 23, the sliding movements of its non-pleated semi-rigid segment 28 in the spherical groove 27 of the semi-rigid segment 25 and of the semi-rigid segment 25 on the spherical outer surface 24 of the outer race 22 will, inherently, be self-lubricating due to the fact that a portion of the inside surfaces of each of the non-pleated semi-rigid and semi-rigid segments 28 and 25, respectively, is in contact with the grease in the drive joint, augmented by the centrifugal forces on the grease during the rotation of the drive joint which will tend to keep grease in contact with all portions of these grease exposed inside surfaces during periods of most frequent articulation of the drive joint.

As another feature of the boot 23, the semi-rigid segment 25, by virtue of its non-elastomeric character, can be retained in place on the spherical outer surface 24 of the outer race by means of a snap fit, without the need for a clamp or ring to assist in such retention. This will further reduce the cost of the parts involved in the manufacture of the drive joint and the cost of assembling such parts. Similarly, the non-pleated semi-rigid segment 28 can be sealingly retained by means of matching ribs 30 in grooves 31 on the input shaft 13 without the need for a clamp or groove to assist in such retention, thus, permitting a further reduction in material and assembly costs.

Figure 2:
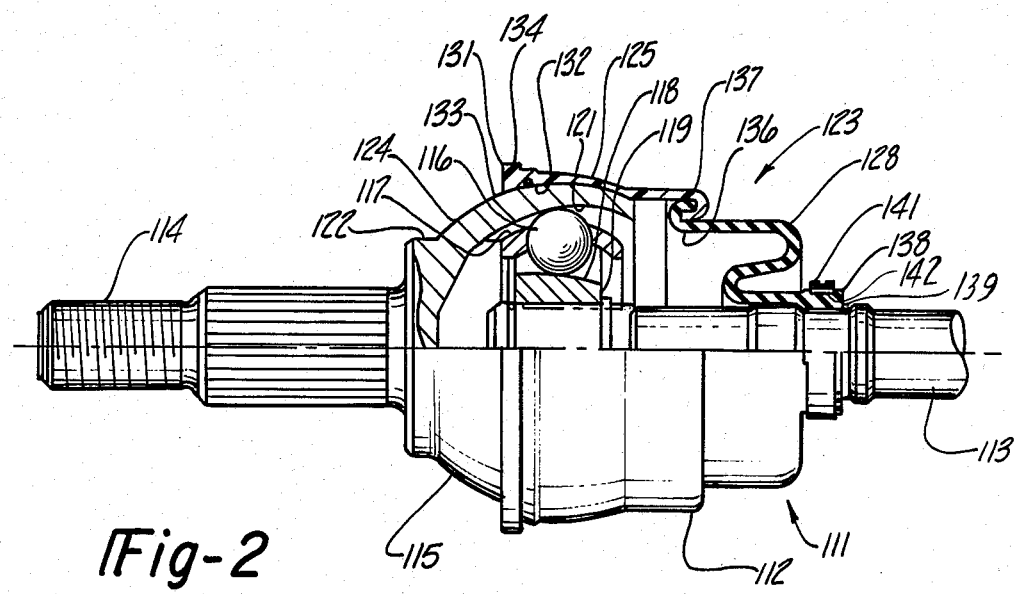
FIG. 2 is an elevational view, partially in section, of a constant velocity drive joint having an alternative embodiment of a sealing boot according to the present invention.

In the embodiment of the invention depicted in FIG. 2 there is provided a drive joint, indicated generally by reference numeral 111, which contains an alternative embodiment of a seal or boot, indicated generally by reference numeral 123. The drive joint 111 receives power at an input end 112 from an input shaft 113 and transmits power to a driven member, not shown, by an output shaft 114 which extends from the output end 115 of the drive joint 111. Power is transmitted from the input shaft 113 to the output shaft 114 by means of a circumferential series of balls 116 which are contained in a bearing cage 117. The balls roll on a spherical surface 118 of an inner race 119, which is keyed or otherwise secured to the input shaft 113 and, simultaneously, the balls 116 roll on a spherical inner surface 121 of an outer race 122, which constitutes an integral part of the output shaft 114.

In operation, the input shaft 113 and the output shaft 114 are subject to articulation or angular distortion from the normal axial orientation between these members, which is depicted in FIG. 2, and this articulation can be of the order of forty-five degrees (45°) in each direction in the case of an automotive front wheel drive joint.

The boot 123 is provided to seal the interior of the drive joint 111 to maintain lubricant therein and to keep dirt and other contaminants therefrom, and the boot 123 must be capable of accommodating the degree of articulation that the drive joint 111 is subject to without loss of its sealing characteristics.

The necessary articulation of the drive joint 111 can be accommodated by the boot 123 by constructing the boot 123 from a pair of boot segments. These boot segments include a first or, semi-rigid boot segment 125, and a second or flexible boot segment 128. Again, as in the case of the embodiment of FIG. 1, the outer race 122 of the drive joint is provided with a spherical outer surface 124, and in the case of a forged outer race, the spherical outer surface 124 is preferably unmachined to reduce the cost thereof. The semi-rigid boot segment 125, which may be formed from a thermosetting polymeric material, for example, has an open end 131, which faces the output shaft 114, and a spherical inner sealing surface 132, which surrounds a portion of a sealing surface 133 of the outer race 122 in surface-to-surface sealing engagement therewith. Due to the spherical configuration of the sealing surfaces 132 and 133, they may be articulated relative to one another for some predetermined degree of articulation, for example, of the order of approximately thirty degrees (30°), without breaking the seal therebetween. This articulation is not needed during the normal operation of the drive joint 111, as the articulation required during these times is provided by the deformation of the pleated portion of the flexible boot segment 128. This deformation will continue until sufficient tension develops along the surface of the flexible boot segment 128 to transmit articulating torque to the semi-rigid boot segment 125.

The boot 123 is maintained in the assembled relationship with the outer race 122 of the drive joint 111, which is illustrated in FIG. 2, by locating the major diameter of the spherical surface 133 of the semi-rigid boot segment 125 inwardly of the open end 131 of the semi-rigid boot segment 125, thus causing the diameter of the open end 131 to be less than the diameter of the spherical sealing surface 133 of the outer race 122 and leading to somewhat of an interference fit between the semi-rigid boot segment 125 and the outer race 122. The assembly may be further secured by positioning the open end 131 of the semi-rigid boot segment 125 in a constricting device 134, such as an O-ring seal.

The flexible boot segment 128 derives its flexibility by being formed from an elastomeric material and from its pleated configuration, as is illustrated in FIG. 2. The flexible boot segment 128 has an output shaft end 136 which sealingly interlocks with an input shaft end 137 of the semi-rigid boot segment 125 in a circumferential pattern, and the flexible boot segment 128 also has an input shaft end 138 which snugly and sealingly engages a portion 139 of the input shaft 113. Thus, by virtue of the construction of the boot 123 as heretofore described, it continuously and circumferentially seals all portions of the drive joint 111 between the open end 131 of the semi-rigid boot segment 125 and the input shaft end 138 of the flexible boot segment 128. The engagement of the input shaft end 138 of the flexible boot segment 128 with the input shaft 113 is enhanced by the use of an annular constricting band 141 which is received in an outwardly facing annular groove 142 in the input shaft end 138 of the flexible boot segment 128.

The seal or boot 123 of the embodiment of the invention depicted in FIG. 2, as heretofore described, is somewhat more resistant to accidental puncturing than prior art flexible sealing boots because of the increased puncture resistance of the types of semi-rigid materials which are suitable for the manufacture of the semi-rigid segment 125 of the boot 123 relative to the flexible materials available for the manufacture of flexible prior art boots. While the flexible boot segment 128 of the boot 123 is subject to accidental puncturing like a prior art flexible sealing boot, this risk is, nonetheless, reduced by the construction illustrated in FIG. 2 because the flexible portion of this construction, the flexible boot segment 128, is smaller in its axial length than its prior art counterpart and because it can be somewhat shielded by a larger diameter semi-rigid boot segment 125, as shown.

Figure 3:
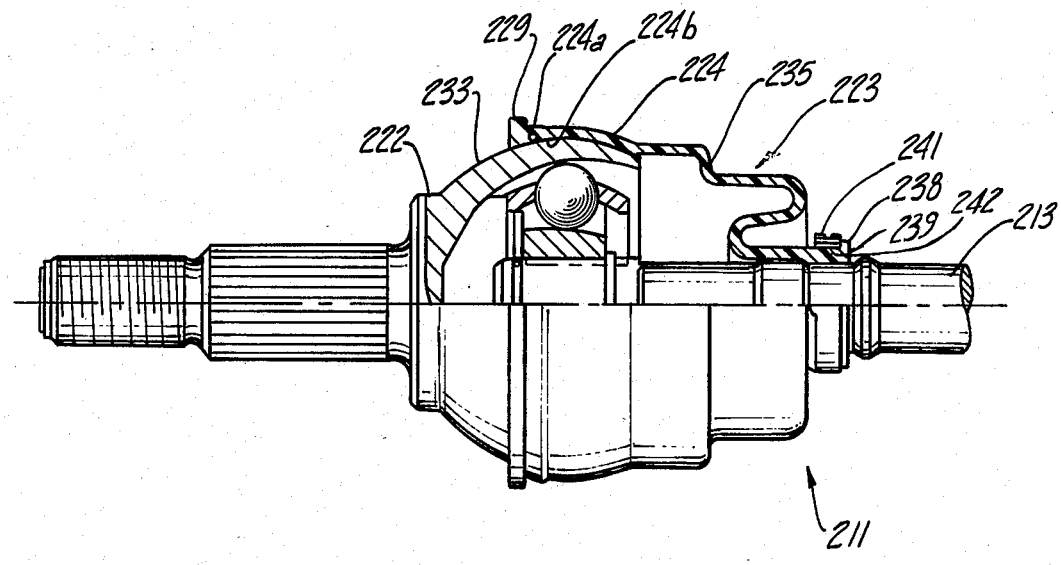
FIG. 3 is an elevational view, partially in section, of a constant velocity drive joint having yet another embodiment of a sealing boot according to the present invention.

In the embodiment of the invention illustrated in FIG. 3, there is provided a modified form of a sealing boot 223 in sealing engagement with a constant velocity drive joint 211. The sealing boot 223 has a single sealing element 224 which performs the functions of both of the boot segments 125 and 128 of the boot 123 of FIG. 2. Thus, the output shaft end 224a of the sealing element 224 surrounds a spherical outer surface 233 of an outer race 222 of the c.v. drive joint 211, and the output shaft end 224a of the sealing element 224 has a spherical inner surface 224b which sealingly engages the spherical outer surface 233 of the outer race of the c.v. drive joint 211. The output shaft end 224a of the sealing element may be maintained securely in place by the means of a constricting device 229, similar to the constricting device 134 of the embodiment of FIG. 2.

The sealing element 224 also has an input shaft end portion 235 which is of a lower hardness of "Durometer" than the output shaft end 224a. The output shaft end 224a of the sealing element 224 is similar in its pleated configuration to the flexible boot segment 128 of the embodiment of FIG. 2. Certain types of urethanes are capable of being manufactured with such hardness characteristics.

The input shaft end portion 235 of the sealing element 224 has a free end 238 which snugly and sealingly engages a portion 239 in an input shaft 213 to the c.v. drive joint 211, and the free end 238 of the sealing element 224 is secured in position relative to the portion 239 of the input shaft 213 by means of a constricting band 241. This constricting band 241 is received in an upwardly facing circumferential groove 242 in the free end portion 238 of the input shaft end portion 235 of the boot 223. The articulation of the c.v. drive joint 211 is initially accommodated by the deformation of the input shaft end portion 235 of the sealing element 224. This articulation can continue until such time as the input shaft end portion 235 has been stretched to the point that it is capable of transmitting articulating torque to the output shaft end 224a. Further articulation of the c.v. drive joint is provided by the articulation of the output shaft end 224a of the sealing element 224 around the sealing, spherical outer surface 233 of the outer race 222, in response to torque transmitted to the output shaft end 224a through the deformed input shaft end portion 235.

Various embodiments of the boot or seal of the present invention have been described in their application to a drive joint of the constant velocity type, because it is contemplated that the invention will have particular utility in that field. It is to be understood, however, that it is contemplated that this type of boot or seal can be used with other types of drive joints, such as tripod or ball contact types, or even non-constant velocity drive joints, such as Hookes or Cardan joints.

While a preferred and certain alternative embodiments of the present invention have been described, it will be apparent to those skilled in the art that changes may be made to the invention as described without departing from the spirit of the invention as defined in the appended claims. Accordingly, the description of this invention as heretofore set forth herein is intended to be illustrative of the principles of the invention and not to limit the scope thereof.

What is claimed is:

1. A boot for sealing a power transmitting mechanical joint, said joint comprising an input shaft, an output shaft, an outer race connected to one of said shafts, and means to transmit power from the other of said shafts to said outer race, said outer race having a spherical outer surface, said input shaft and said output shaft being subject to articulation relative to one another during the operation of said mechanical joint, said boot comprising, in combination:

a first portion comprising a first boot segment formed from a non-flexible material and surrounding a portion of said spherical outer surface of said outer race, said first portion having a spherical inner surface which engages said spherical outer surface of said outer race in surface-to-surface sealing relationship therewith, said first portion having a spherical groove which faces the other of said shafts and being capable of articulating with respect to said outer race without the loss of the sealing relationship therewith; and a second portion comprising a second boot segment formed from a non-flexible material and extending from said first portion and sealingly engaging the other of said shafts, said second portion, together with said first portion, sealing the joint between said outer race and the other of said shafts to retain lubricant within said joint and to prevent dirt and other contaminants from entering said joint, said second portion having a spherical end which is sealingly and slidingly received in said spherical groove of said first portion and being capable of being sealingly articulated with respect to said first portion;

said spherical groove in said first portion being of a limited extent so that the articulation of said second portion with respect to said first portion causes said spherical end of said second portion to bottom in said spherical groove in said first portion, said boot being capable of further articulation by the articulation of said first portion with respect to said outer race of said power transmitting mechanical joint after said spherical end of said second portion bottoms in said spherical groove in said second portion.

2. The boot according to claim 1 wherein said second portion is non-pleated in configuration.

3. A power transmitting mechanical joint comprising:
an input shaft;
an output shaft spaced relative to said input shaft;
an outer race connected to one of said shafts;
means to transmit power from the other of said shafts to said outer race, said power transmitting means being mounted to the other of said shafts;
said outer race having a spherical outer surface;
said input shaft and said output shaft being subject to articulation relative to one another during the operation of said power transmitting mechanical joint; and
a boot for sealing said power transmitting mechanical joint, said boot comprising a first portion formed from a non-flexible material and surrounding a portion of said spherical outer surface of said outer race, said first portion having a spherical inner surface which engages said spherical outer surface of said outer race in surface-to-surface sealing relationship therewith, said first portion having a spherical groove which faces the other of said shafts and being capable of articulating with respect to said outer race without the loss of the sealing relationship therewith, said boot further comprising a second portion which is formed from a non-flexible material and extends from said first portion and sealingly engages the other of said shafts, said second portion having a spherical end which is slidingly and sealingly received in said spherical groove of said first portion and being capable of being sealingly articulated with respect to said first portion, said second portion further, together with said first portion, sealing, said mechanical joint between said outer race and the other of said shafts;

said spherical groove in said first portion being of a limited extent so that the articulation of said second portion with respect to said first portion causes said spherical end of said second portion to bottom in said spherical groove in said first portion, said boot being capable of further articulation by the articulation of said first portion with respect to said outer race of said power transmitting mechanical joint after said spherical end of said second portion bottoms in said spherical groove in said second portion.

4. The power transmitting mechanical joint according to claim 3 in which said mechanical joint is a constant velocity drive joint.

5. The power transmitting mechanical joint according to claim 4 wherein said constant velocity drive joint is a front wheel drive joint for a front wheel drive automotive vehicle.

6. The power transmitting mechanical joint according to claim 5 wherein said input shaft and said output shaft of said front wheel drive joint are subject to at least approximately twenty degrees articulation in each direction relative to one another during normal operation.

7. The power transmitting mechanical joint according to claim 6 wherein said input shaft and said output shaft of said front wheel drive joint are subject to at least approximately forty-five degrees of articulation in each direction on various occasions during the operation thereof.

8. The power transmitting mechanical joint according to claim 3 wherein said second portion is non-pleated in configuration.

9. The power transmitting mechanical joint according to claim 3 wherein said second portion can be sealingly articulated with respect to said first portion for at least approximately twenty degrees in each direction and wherein said first portion can be sealingly articulated with respect to said outer race for at least approximately twenty-five degrees in each direction.

10. The power transmitting mechanical joint according to claim 3 wherein said outer race is integrally connected to said one of said shafts.

11. The power transmitting mechanical joint according to claim 10 wherein said one of said shafts is the output shaft.

12. The power transmitting mechanical joint according to claim 3 wherein said outer race is provided by forging and wherein said spherical outer surface thereof is unmachined.

* * * * *

UNITED STATES PATENT AND TRADEMARK OFFICE
CERTIFICATE OF CORRECTION

PATENT NO. : 4,627,826
DATED : December 9, 1986
INVENTOR(S) : Juziuk et al

It is certified that error appears in the above-identified patent and that said Letters Patent is hereby corrected as shown below:

Column 3, line 31, delete "nonflexible" and insert ---- non-flexible ----.

Column 6, line 35, after "or" delete the comma ",".

Column 8, line 28, delete "a".

Column 9, line 12, delete "second" and insert ---- first ----.

Column 9, line 49, after "sealing" delete the comma ",".

Column 10, line 10, delete "second" and insert ---- first ----.

Signed and Sealed this

Twentieth Day of October, 1987

Attest:

DONALD J. QUIGG

*Attesting Officer*

*Commissioner of Patents and Trademarks*